United States Patent
Seo et al.

(10) Patent No.: US 9,730,183 B2
(45) Date of Patent: Aug. 8, 2017

(54) METHOD FOR REPORTING A CHANNEL QUALITY INDICATOR BY A RELAY NODE IN A WIRELESS COMMUNICATION SYSTEM, AND APPARATUS FOR SAME

(75) Inventors: Inkwon Seo, Anyang-si (KR); Hanbyul Seo, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/703,612

(22) PCT Filed: Sep. 5, 2011

(86) PCT No.: PCT/KR2011/006554
§ 371 (c)(1),
(2), (4) Date: Dec. 11, 2012

(87) PCT Pub. No.: WO2012/043992
PCT Pub. Date: Apr. 5, 2012

(65) Prior Publication Data
US 2013/0083719 A1  Apr. 4, 2013

Related U.S. Application Data

(60) Provisional application No. 61/388,584, filed on Sep. 30, 2010, provisional application No. 61/392,464, (Continued)

(51) Int. Cl.
*H04W 72/00* (2009.01)
*H04B 17/24* (2015.01)
(Continued)

(52) U.S. Cl.
CPC .......... *H04W 72/005* (2013.01); *H04B 17/24* (2015.01); *H04L 5/0057* (2013.01);
(Continued)

(58) Field of Classification Search
CPC .. H04B 17/0067; H04L 5/0057; H04W 24/10; H04W 48/16; H04W 72/005; H04W 84/047
(Continued)

(56) References Cited

U.S. PATENT DOCUMENTS

2008/0232396 A1* 9/2008 Buckley et al. ............. 370/465
2009/0252077 A1* 10/2009 Khandekar ......... H04W 72/082
370/312

(Continued)

FOREIGN PATENT DOCUMENTS

CN  101388704  3/2009
JP  2010-219817  9/2010

(Continued)

OTHER PUBLICATIONS

ETSI TS 136 213 V9.2.0 (Jun. 2010) ; LTE; E-UTRA; Physical layer procedures (3GPP TS 36.213 Verison 9.2.0 Release 9.*

(Continued)

*Primary Examiner* — Andrew Lai
*Assistant Examiner* — Mahmudul Hasan
(74) *Attorney, Agent, or Firm* — Lee Hong Degerman Kang Waimey

(57) ABSTRACT

The present invention relates to a method for reporting a channel quality indicator for a relay node-dedicated physical downlink shared channel (R-PDSCH) from a base station by a relay node in a wireless communication system. More particularly, the method comprises the following steps: receiving one or more reference signals from the base station; calculating a channel quality indicator for the R-PDSCH on the basis of one or more reference signals; and reporting the channel quality indicator to the base station.

10 Claims, 15 Drawing Sheets

Related U.S. Application Data filed on Oct. 12, 2010, provisional application No. 61/441,651, filed on Feb. 10, 2011, provisional application No. 61/482,202, filed on May 3, 2011.

(51) Int. Cl.
| | |
|---|---|
| *H04L 5/00* | (2006.01) |
| *H04W 24/10* | (2009.01) |
| *H04W 48/16* | (2009.01) |
| *H04W 84/04* | (2009.01) |

(52) U.S. Cl.
CPC ............ *H04W 24/10* (2013.01); *H04W 48/16* (2013.01); *H04W 84/047* (2013.01)

(58) Field of Classification Search
USPC ..... 370/312, 336, 329, 315; 455/501, 452.2, 455/561
See application file for complete search history.

(56) References Cited

U.S. PATENT DOCUMENTS

| | | | | |
|---|---|---|---|---|
| 2010/0008282 | A1* | 1/2010 | Bhattad et al. | 370/312 |
| 2010/0046412 | A1* | 2/2010 | Varadarajan | H04L 5/003 370/312 |
| 2010/0182903 | A1* | 7/2010 | Palanki et al. | 370/225 |
| 2010/0214972 | A1* | 8/2010 | Che | H04W 72/0426 370/315 |
| 2010/0238845 | A1* | 9/2010 | Love et al. | 370/280 |
| 2010/0239034 | A1* | 9/2010 | Lee et al. | 375/260 |
| 2010/0260154 | A1* | 10/2010 | Frank et al. | 370/336 |
| 2010/0272004 | A1* | 10/2010 | Maeda | H04L 5/0007 370/312 |
| 2010/0272009 | A1* | 10/2010 | Cheng | H04W 52/346 370/315 |
| 2010/0272040 | A1* | 10/2010 | Nam | H04J 13/0077 370/329 |
| 2010/0278132 | A1* | 11/2010 | Palanki et al. | 370/329 |
| 2010/0303013 | A1* | 12/2010 | Khandekar | H04W 99/00 370/328 |
| 2010/0322227 | A1* | 12/2010 | Luo | H04B 7/024 370/345 |
| 2010/0323709 | A1* | 12/2010 | Nam | H04L 5/0094 455/450 |
| 2010/0323745 | A1* | 12/2010 | Chen et al. | 455/522 |
| 2011/0045860 | A1* | 2/2011 | Nam et al. | 455/509 |
| 2011/0170496 | A1* | 7/2011 | Fong et al. | 370/329 |
| 2011/0188481 | A1* | 8/2011 | Damnjanovic | H04W 72/04 370/336 |
| 2011/0194504 | A1* | 8/2011 | Gorokhov | H04B 7/0417 370/329 |
| 2011/0199986 | A1* | 8/2011 | Fong et al. | 370/329 |
| 2011/0200131 | A1* | 8/2011 | Gao et al. | 375/267 |
| 2011/0205951 | A1* | 8/2011 | Lee | H04W 4/18 370/312 |
| 2011/0222411 | A1* | 9/2011 | Koskinen et al. | 370/241 |
| 2011/0228718 | A1* | 9/2011 | Noh et al. | 370/312 |
| 2011/0307611 | A1* | 12/2011 | Callard | 709/226 |
| 2012/0008522 | A1* | 1/2012 | Ng | H04L 1/0026 370/252 |
| 2012/0051256 | A1* | 3/2012 | Yuda et al. | 370/252 |
| 2012/0063343 | A1* | 3/2012 | Yuda et al. | 370/252 |
| 2012/0093071 | A1* | 4/2012 | Huang et al. | 370/315 |
| 2012/0195226 | A1* | 8/2012 | Liu | H04L 1/0026 370/252 |
| 2012/0294225 | A1* | 11/2012 | Awad | H04B 7/15528 370/315 |
| 2012/0314629 | A1* | 12/2012 | Ng | H04L 1/0026 370/280 |
| 2013/0044674 | A1* | 2/2013 | Teyeb et al. | 370/315 |

FOREIGN PATENT DOCUMENTS

| | | |
|---|---|---|
| JP | 2012-514443 | 6/2012 |
| JP | 2012-514960 | 6/2012 |
| JP | 2013-514029 | 4/2013 |
| JP | 2013-541874 | 11/2013 |
| KR | 10-2009-0114453 | 11/2009 |
| WO | 2010107129 | 9/2010 |

OTHER PUBLICATIONS

LTE, "Evolved Universal Terrestrial Radio Access (E-UTRA); Physical layer procedures (3GPP TS 36.213 version 9.2.0 Release 9", ETSI TS 136 213 V9.2.0, Jun. 2010, 82 pages.

3RD Generation Partnership Project (3GPP), "Technical Specification Group Radio Access Network; Evolved Universal Terrestrial Radio Access (E-UTRA); Physical Layer procedures (Release 8)", 3GPP TS 36.213 V8.1.0, Nov. 2007, 17 pages.

IP Australia Application Serial No. 2011308292, Office Action dated Nov. 28, 2013, 5 pages.

3rd Generation Partnership Project (3GPP), "Technical Specification Group Radio Access Network; Evolved Universal Terrestrial Radio Access (E-UTRA); Physical layer procedures (Release 9)", 3GPP TS 36.213 V9.2.0, Jun. 2010, 80 pages. (Relevant sections 7-10).

3rd Generation Partnership Project (3GPP), "Technical Specification Group Radio Access Network; Evolved Universal Terrestrial Radio Access (E-UTRA); Multiplexing and channel coding ( Release 9)", 3GPP TS 36.212 V9.2.0, Jun. 2010, 61 pages. (Relevant sections 5.2-5.3).

PCT International Application No. PCT/KR2011/006554, Written Opinion of the International Searching Authority dated Apr. 20, 2012, 11 pages.

The State Intellectual Property Office of the People's Republic of China Application Serial No. 201180026309.2, Office Action dated Dec. 3, 2014, 6 pages.

European Patent Office Application Serial No. 11829498.2, Search Report dated Dec. 14, 2016, 10 pages.

Motorola, "Introduction of Rel-10 LTE-Advanced features in 36.213", R1-105111, 3GPP TSG-RAN Meeting #62, Aug. 2010, 82 pages.

Qualcomm Incorporated, "CSI-RS for LTE-Advanced", R1-103545, 3GPP TSG-RAN WG1 #61bis, Jul. 2010, 8 pages.

Texas Instruments, "CQI reference resource with CSI-RS", R1-110260, 3GPP TSG RAN WG1 #63bis, Jan. 2011, 6 pages.

Samsung, "Reference Resource size for CQI calculation in LTE-A", R1-110087, 3GPP TSG RAN WG1 #63bis, Jan. 2011, 4 pages.

* cited by examiner (a) CONTROL-PLANE PROTOCOL STACK (b) USER-PLANE PROTOCOL STACK (a)

(b)

METHOD FOR REPORTING A CHANNEL QUALITY INDICATOR BY A RELAY NODE IN A WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2011/006554, filed on Sep. 5, 2011, which claims the benefit of U.S. Provisional Application Ser. No. 61/388,584, filed on Sep. 30, 2010, and U.S. Provisional Application Ser. No. 61/392,464, filed on Oct. 12, 2010, and U.S. Provisional Application Ser. No. 61/441,651, filed on Feb. 10, 2011 and U.S. Provisional Application Ser. No. 61/482,202, filed on May 3, 2011, the contents of which are all incorporated by reference herein in their entirety.

TECHNICAL FIELD

The present invention relates to a wireless communication system, and more particularly, to a method and apparatus for reporting a channel quality indicator by a relay node in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention is to provide a method and apparatus for reporting a channel quality indicator by a relay node in a wireless communication system.

Technical Solution

The object of the present invention can be achieved by providing a method for reporting a channel quality indicator for a relay node-dedicated physical downlink shared channel (R-PDSCH) from a base station by a relay node in a wireless communication system, the method including receiving one or more reference signals from the base station, calculating the channel quality indicator for the R-PDSCH based on the one or more reference signals, and reporting the channel quality indicator to the base station, wherein the channel quality indicator is calculated on the assumption that a predetermined number $N_{RE}$ of available resource elements is included in a subframe in which the R-PDSCH is transmitted, and wherein the predetermined number $N_{RE}$ of available resource elements is determined based on at least one of information about a starting symbol of the R-PDSCH and information about a last symbol of the R-PDSCH, the starting symbol and the last symbol being set by a higher layer signal.

In another aspect of the present invention, there is provided a relay node in a wireless communication system, including a reception module configured to receive one or more reference signals from a base station, a processor configured to calculate a channel quality indicator for relay node-dedicated physical downlink shared channel (R-PDSCH) based on the one or more reference signals, and a transmission module configured to report the channel quality indicator to the base station, wherein the processor calculates the channel quality indicator on the assumption that a predetermined number $N_{RE}$ of available resource elements is included in a subframe in which the R-PDSCH is transmitted, and wherein the predetermined number $N_{RE}$ of available resource elements is determined based on at least one of information about a starting symbol of the R-PDSCH and information about a last symbol of the R-PDSCH, the starting symbol and the last symbol being set by a higher layer signal.

In the predetermined number $N_{RE}$ of available resource elements, if the last symbol is reserved for transmission/reception switching timing of the relay node, resource elements corresponding to the last symbol may be excluded from the number of resource elements for transmitting the R-PDSCH.

The predetermined number $N_{RE}$ of available resource elements may exclude the number of resource elements for a user equipment (UE)-specific reference signal which may be included in the subframe in which the R-PDSCH is transmitted, and the number of resource elements for the UE-specific reference signal may be 12 or 24.

It may be assumed that a relay node-dedicated physical control channel (R-PDCCH) is not transmitted in the subframe in which the R-PDSCH is transmitted may be made, and the predetermined number of available resource elements excludes the number of resource elements included in a search space for a relay node-dedicated physical control channel (R-PDCCH).

In another aspect of the present invention, there is provided a method for reporting a channel quality indicator for a physical downlink shared channel (PDSCH) from a base station by a user equipment (UE) in a wireless communication system, the method including receiving one or more reference signals from the base station, calculating the channel quality indicator for the PDSCH based on the one or more reference signals, and reporting the channel quality indicator to the base station, wherein the channel quality indicator is calculated on the assumption that a predetermined number $N_{RE}$ of available resource elements is included in a subframe in which the PDSCH is transmitted, and wherein the predetermined number $N_{RE}$ of available resource elements excludes the number of resource elements for a cell-specific reference signal corresponding to a data region of the subframe. The PDSCH may be demodulated based on a UE-specific reference signal The UE may be set to transmission mode 9 and the one or more reference signals may be received in a multicast broadcast single frequency network (MBSFN) subframe.

In another aspect of the present invention, there is provided a method for reporting a channel quality indicator for a physical downlink shared channel (PDSCH) from a base station by a user equipment (UE) in a wireless communication system, the method including receiving one or more reference signals from the base station, calculating the channel quality indicator for the PDSCH based on the one or more reference signals, and reporting the channel quality indicator to the base station, wherein the channel quality indicator is calculated on the assumption that a predetermined number $N_{RE}$ of available resource elements is included in a subframe in which the PDSCH is transmitted and an enhanced-physical downlink control channel (E-PDCCH) is not transmitted in the subframe in which the PDSCH is transmitted.

In another aspect of the present invention, there is provided a method for reporting a channel quality indicator for a physical downlink shared channel (PDSCH) from a base station by a user equipment (UE) in a wireless communication system, the method including receiving one or more reference signals from the base station, calculating the channel quality indicator for the PDSCH based on the one or more reference signals, and reporting the channel quality indicator to the base station, wherein the channel quality indicator is calculated on the assumption that a predetermined number $N_{RE}$ of available resource elements is included in a subframe in which the PDSCH is transmitted, and wherein the predetermined number $N_{RE}$ of available resource elements excludes the number of resource elements for a search space for an enhanced-physical downlink control channel (E-PDCCH).

Advantageous Effects

According to the embodiments of the present invention, it is possible to more accurately and efficiently calculate a channel quality indicator by a relay node in a wireless communication system.

The effects of the present invention are not limited to the above-described effects and other effects which are not described herein will become apparent to those skilled in the art from the following description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
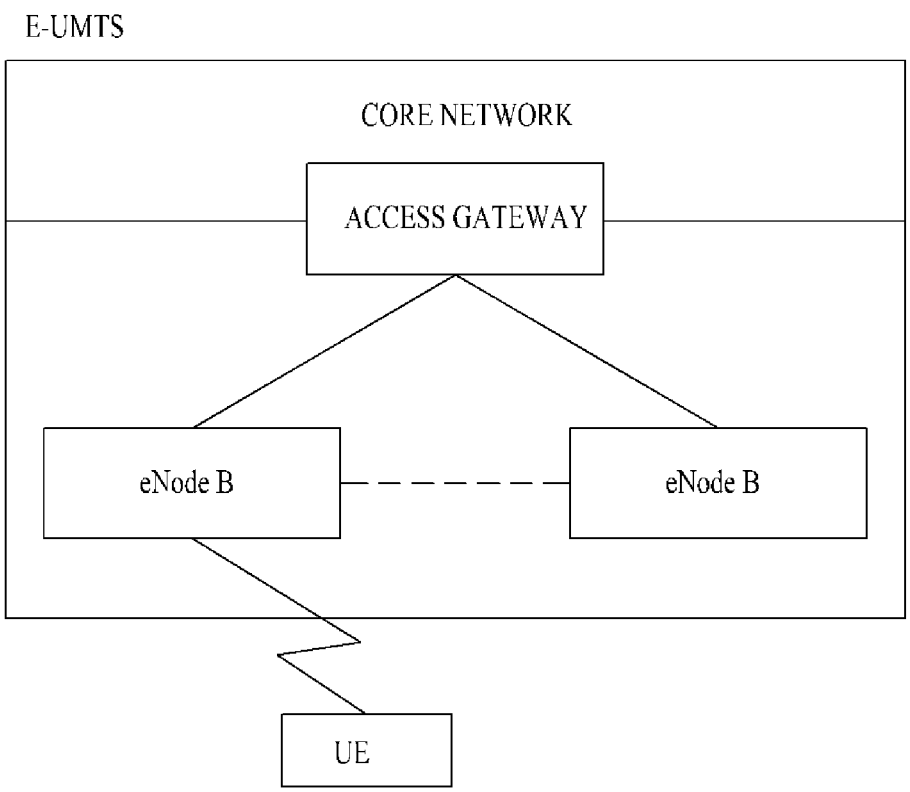
FIG. 1 is a diagram showing a network structure of an Evolved Universal Mobile Telecommunications System (E-UMTS) as an example of a wireless communication system.
Figure 2:
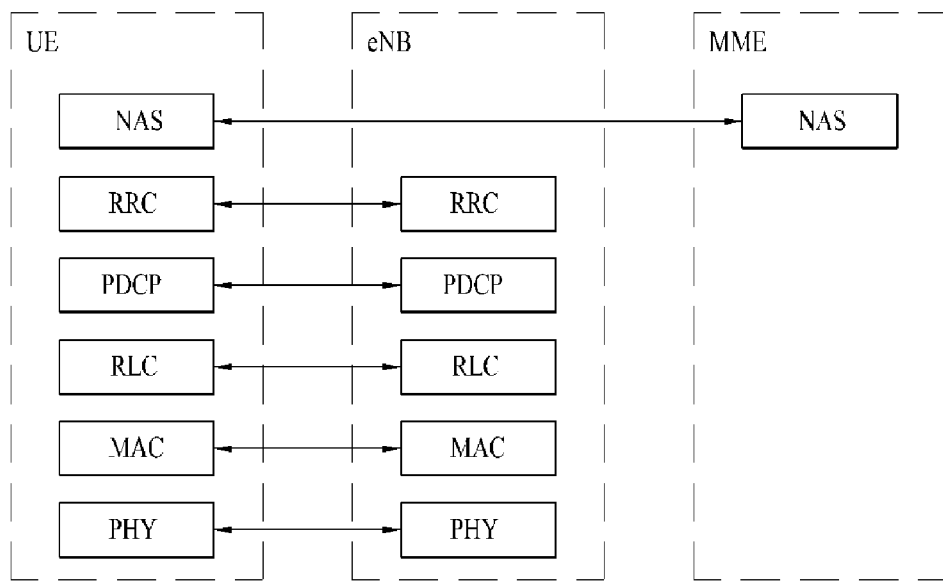
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
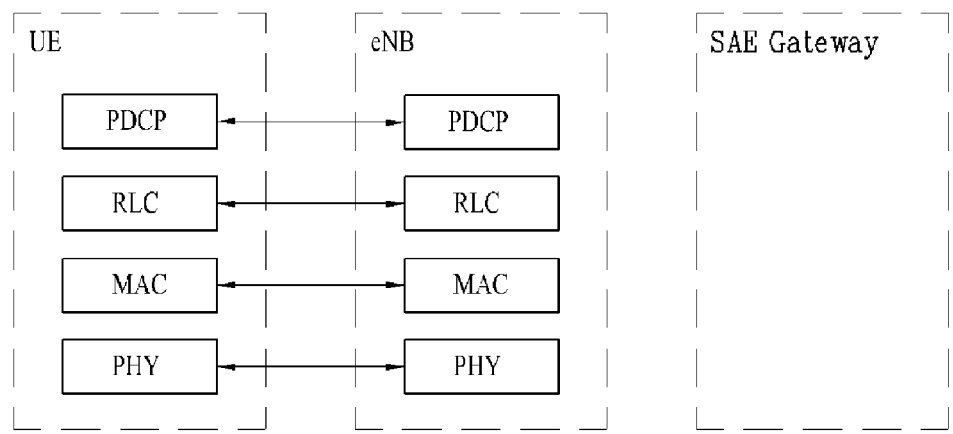

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
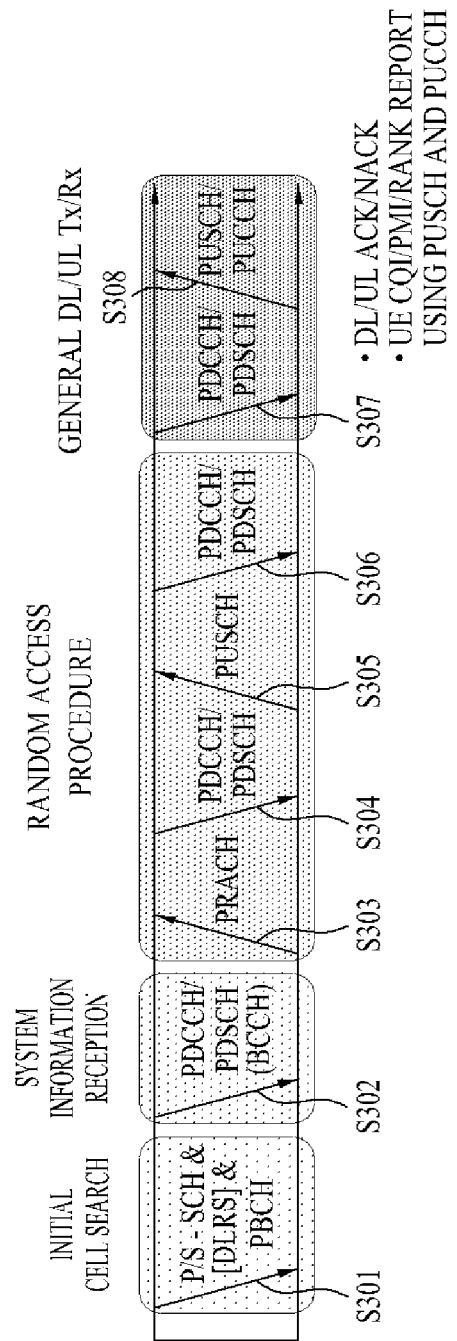
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
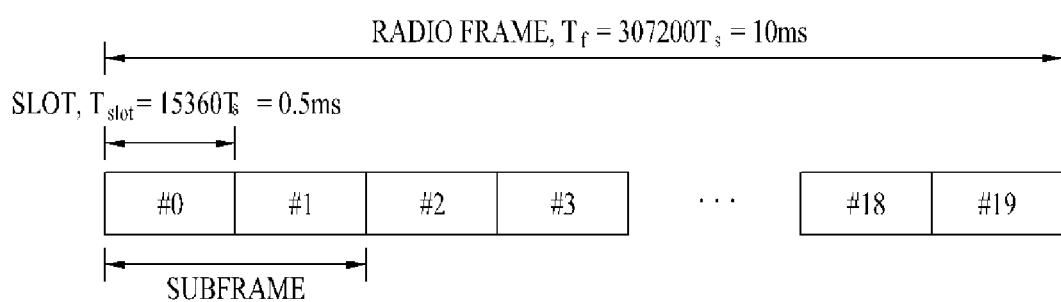
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms (327200×$T_s$) and includes 10 subframes with the same size. Each of the subframes has a length of 1 ms and includes two slots. Each of the slots has a length of 0.5 ms (15360×$T_s$). $T_s$ denotes a sampling time, and is represented by $T_s$=1/(15 kHz×2048)=3.2552×10$^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
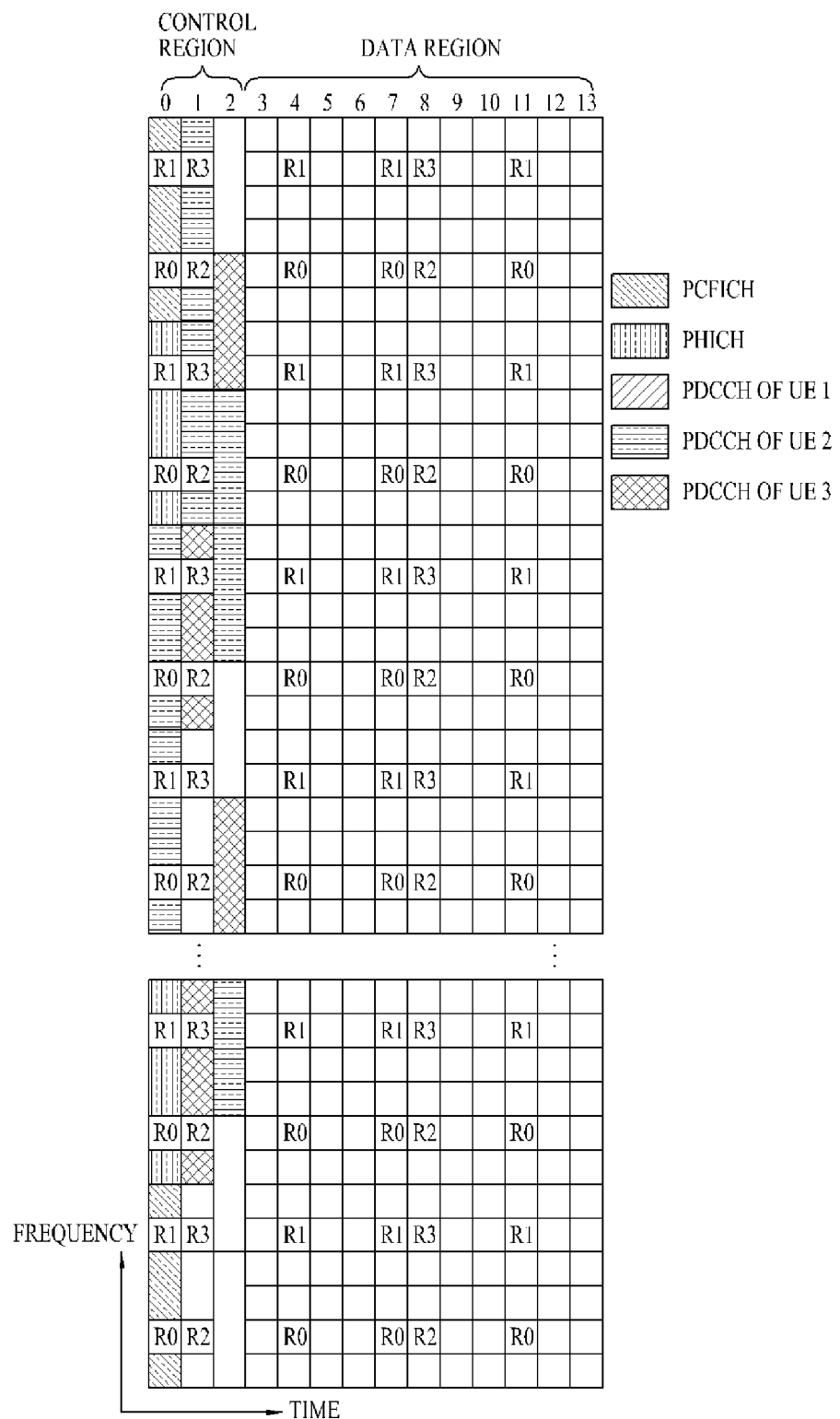
FIG. 5 is a diagram showing the structure of a downlink radio frame in an LTE system.

FIG. 5 is a diagram showing a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or a pilot signal for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to transmit HARQ ACK/NACK for uplink transmission. That is, the PHICH indicates a channel for transmitting DL ACK/NACK information for UL HARQ. The PHICH includes one REG and is scrambled on a cell-specific basis. ACK/NACK is indicated by one bit and is modulated by binary phase shift keying (BPSK). The modulated ACK/NACK is spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in a frequency domain and/or a time domain, in order to obtain diversity gain.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the MIMO technique, a single antenna path is not used for receiving one message. Instead, in the MIMO technique, data fragments received via several antennas are collected and combined so as to complete data. If the MIMO technique is used, a data transfer rate may be improved within a cell region having a specific size or system coverage may be increased while ensuring a specific data transfer rate. In addition, this technique may be widely used in a mobile communication terminal, a repeater and the like. According to the MIMO technique, it is possible to overcome a limit in transmission amount of conventional mobile communication using a single antenna.

Figure 6:
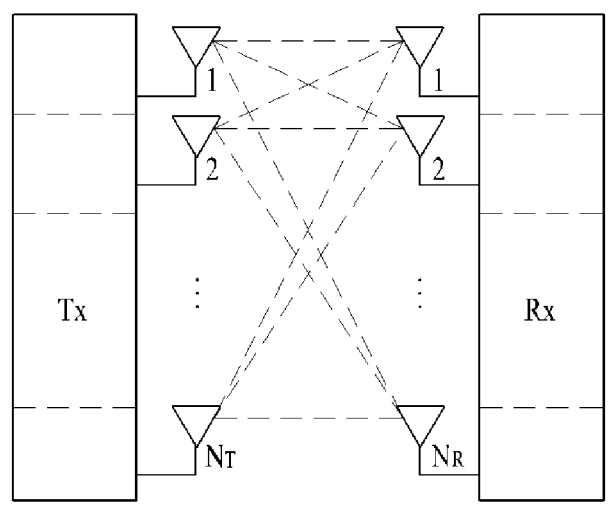
FIG. 6 is a diagram showing the configuration of a general multiple-input multiple-output (MIMO) communication system.

The configuration of the general multi-antenna (MIMO) communication system is shown in FIG. 6. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1. Here, $R_i$ is the smaller of the two values $N_T$ and $N_R$.

$$R_i = \min(N_T, N_R) \qquad \text{Equation 1}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 6, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s=[s_1, s_2, \ldots, s_{N_T}]^T \qquad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \qquad \text{Equation 3}$$

In addition, $\hat{s}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \qquad \text{Equation 6}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7.

$$\text{\# of streams} \leq \text{rank}(H) \leq \min(N_T, N_R) \qquad \text{Equation 7}$$

where, "# of streams" denotes the number of streams. One stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Hereinafter, a reference signal (RS) will be described in greater detail. In general, for channel measurement, an RS, of which both a transmission side and a reception side are already aware, is transmitted from the transmission side to the reception side, along with data. The RS indicates channel measurement and a modulation scheme so as to enable a demodulation process. The RS is divided into a dedicated RS (DRS) for an eNB and a specific UE, that is, a UE-specific RS, and a common RS (CRS) which is a cell-specific RS for all UEs within a cell. The cell-specific RS includes an RS which is used to enable the UE to measure and report a CQI/PMI/RI to the eNB and is also referred to as a Channel State Information (CSI)-RS.

Figure 7:
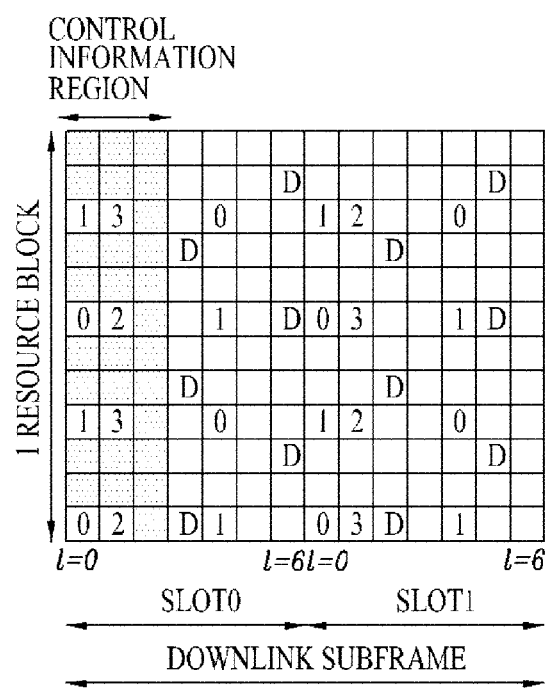
FIGS. 7 and 8 are diagrams showing the structure of a reference signal in an LTE system supporting downlink transmission using four antennas.
Figure 8:
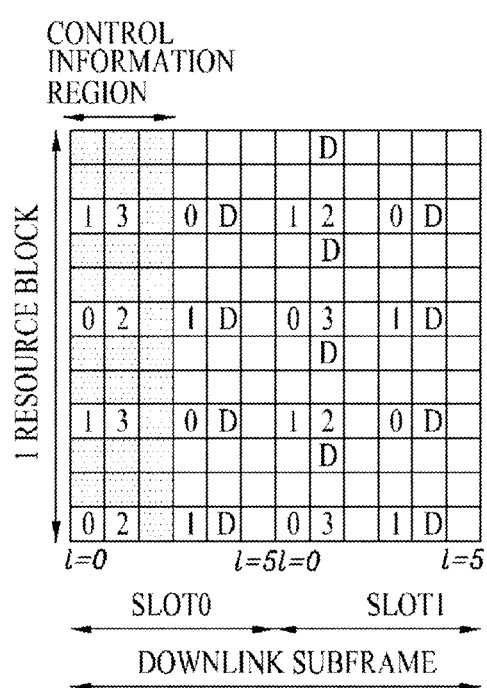

FIGS. 7 and 8 are diagrams showing the structure of an RS in an LTE system supporting downlink transmission using four antennas. In particular, FIG. 7 shows a normal Cyclic Prefix (CP) and FIG. 8 shows an extended CP.

Referring to FIGS. 7 and 8, 0 to 3 described in blocks indicate CRSs which are cell-specific RSs transmitted via antenna ports 0 to 3 for channel measurement and data demodulation and the CRS which is the cell-specific RS may be transmitted to the UE over a data information region or a control information region.

"D" described in a block indicates a downlink Demodulation (DM)-RS which is a UE-specific RS and supports single-antenna port transmission through a data region, that is, through a PDCCH. The UE receives information indicating whether or not a DM-RS, which is the UE-specific RS, is present through a higher layer. FIGS. 7 and 8 show DM-RSs corresponding to an antenna port 5. DM-RSs for antenna ports 7 to 14 are also defined in the 3GPP standard document 36.211.

A mapping rule of an RS to a resource block (RB) may be shown in Equations 8 to 10. Equation 8 shows a CRS mapping rule. Equation 9 shows a mapping rule of a DRS to which the normal CP is applied and Equation 10 shows a mapping rule of a DRS to which the extended CP is applied.

$$k = 6m + (v + v_{shift}) \bmod 6 \quad \text{Equation 8}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{Equation 9}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{Equation 10}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 8 to 10, k and p denote a subcarrier index and an antenna port, respectively. $N_{RB}^{DL}$, $n_s$ and $N_{cell}^{ID}$ denote the number of RBs allocated to downlink, the number of slot indexes and the number of cell IDs, respectively. The position of the RS is changed according to a value $V_{shift}$ from the viewpoint of a frequency domain.

If a channel state between an eNB and a UE is bad, a relay node (RN) may be provided between the eNB and the UE to provide the UE with a radio channel having a good channel state. In a cell boundary in which a channel state from an eNB is bad, an RN may be used to provide a high-rate data channel and extend a cell service region. Currently, the RN is widely being used as a technique for eliminating a shadow area in a wireless communication system.

The RN has been developed to an intelligent form in addition to a repeater function for amplifying a signal and transmitting the amplified signal. The RN technology is necessary to reduce costs consumed to install more base stations or costs consumed to maintain a backhaul network in a next-generation mobile communication system, to enlarge service coverage, and to improve data throughput. As the RN technology has been gradually developed, a new wireless communication system needs to support an RN used in a conventional wireless communication system.

In a 3$^{rd}$ Generation Partnership Project Long Term Evolution-Advanced (3GPP LTE-A) system, as a role of forwarding a link between an eNB and a UE is introduced into to a relay node, two links having different attributes are applied to uplink and downlink carrier frequency bands. A link part between an eNB and an RN is defined as a backhaul link. Transmission performed using downlink resources in a frequency division duplexing (FDD) or time division duplexing (TDD) scheme is referred to as backhaul downlink and transmission performed using uplink resources in a FDD or TDD scheme is referred to as backhaul uplink.

Figure 9:
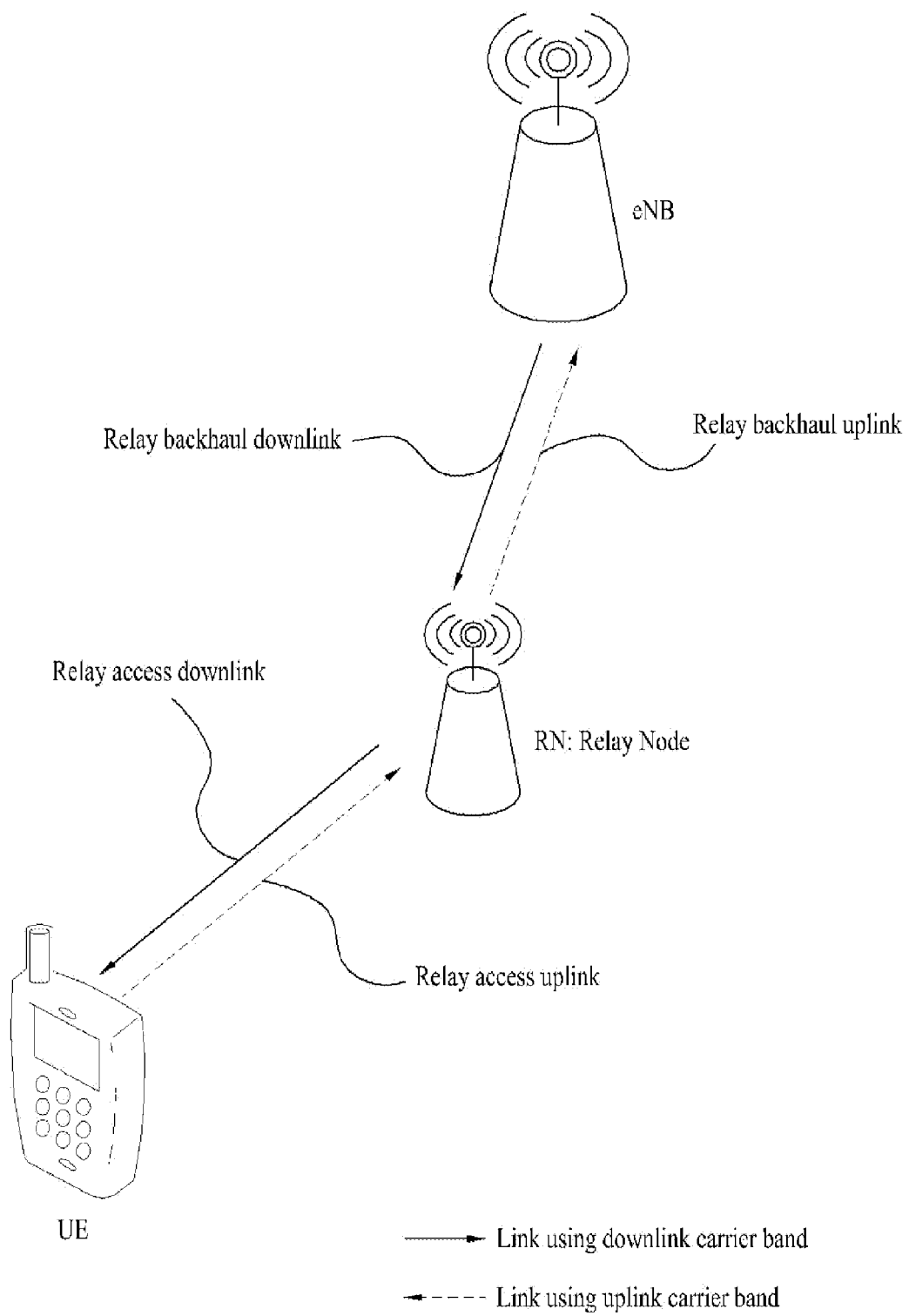
FIG. 9 is a diagram showing the configuration of a relay backhaul link and a relay access link in a wireless communication system.

FIG. 9 is a diagram showing the configuration of a relay backhaul link and a relay access link in a wireless communication system.

Referring to FIG. 9, in an LTE-A system, as a role of forwarding a link between an eNB and a UE is introduced into a relay node, two links having different attributes are applied to uplink and downlink carrier frequency bands. A link part between an eNB and an RN is defined as a relay backhaul link. Transmission performed using a downlink frequency band (in case of frequency division duplexing (FDD)) or a downlink subframe (in case of time division duplexing (TDD)) is referred to as backhaul downlink and transmission performed using an uplink frequency band (in case of FDD) or an uplink subframe (in case of TDD) is referred to as backhaul uplink.

In contrast, a link part between an RN and a series of UEs is defined as a relay access link. Transmission performed using a downlink frequency band (in case of frequency division duplexing (FDD)) or a downlink subframe (in case of time division duplexing (TDD)) is referred to as access downlink and transmission performed using an uplink frequency band (in case of FDD) or an uplink subframe (in case of TDD) is referred to as access uplink.

An RN may receive information from an eNB via relay backhaul downlink and transmit information to an eNB via relay backhaul uplink. In addition, the RN may transmit information to a UE via relay access downlink and receive information from a UE via relay access uplink.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have a cell identity thereof. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 RN is an in-band RN for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 RN as a legacy eNodeB (an eNodeB which operates according to the LTE Release-8 system). That is, the Type-1 relay has backward compatibility. The UEs which operates according to the LTE-A system regard the Type-1 RN as an eNodeB different from the legacy eNodeB, thereby achieving performance improvement.

The Type-1a RN has the same characteristics as the above-described Type-1 RN except that the Type-1a RN operates as an out-band RN. The Type-1a RN may be configured so as to minimize or eliminate an influence of the operation thereof on an L1 (first layer) operation.

The Type-2 RN is an in-band RN and does not have a separate physical cell ID. Thus, a new cell is not established. The Type-2 RN is transparent to the legacy UE and the legacy UE does not recognize the presence of the Type-2 RN. The Type-2 RN can transmit a PDSCH, but does not transmit at least a CRS (Cell-specific Reference Signal) and a PDCCH.

In order to enable the RN to operate as an in-band RN, some resources in a time-frequency space must be reserved for the backhaul link so as not to be used for the access link. This is called resource partitioning.

The general principle of resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band RN, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed during the gap. Such a gap may be set by configuring a Multicast Broadcast Single Frequency Network (MBSFN) subframe.

Figure 10:
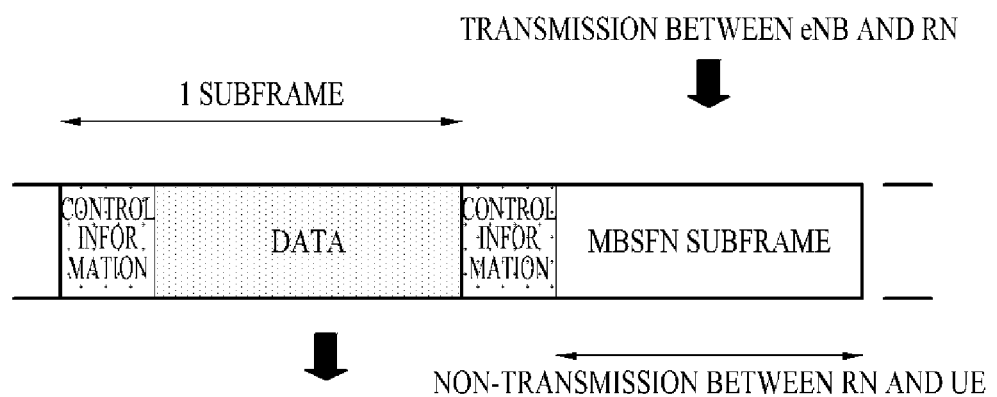
FIG. 10 is a diagram showing an example of relay node resource partitioning.

FIG. 10 is a diagram showing an example of RN resource partitioning.

In FIG. 10, a first subframe is a general (a non-MBSFN) subframe, in which a downlink (that is, access downlink) control signal and data is transmitted from the RN to the UE, and a second subframe is an MBSFN subframe, in which a control signal is transmitted from the RN to the UE in a control region of the downlink subframe, but any signal is not transmitted from the RN to the UE in the remaining region of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region of the second subframe, it is possible to provide backward compatibility to the legacy UE served by the RN. While any signal is not transmitted from the RN to the UE in the remaining region of the second subframe, the RN may receive the signal transmitted from the eNodeB. Accordingly, the resource partitioning disables the in-band RN to simultaneously perform the access downlink transmission and the backhaul downlink reception.

The second subframe using the MBSFN subframe will now be described in detail. The control region of the second subframe may be an RN non-hearing interval. The RN non-hearing interval refers to an interval in which the RN does not receive a backhaul downlink signal and transmits an access downlink signal. This interval may be set to 1, 2 or OFDM lengths as described above. The RN performs the access downlink transmission to the UE in the RN non-hearing interval and performs the backhaul downlink reception from the eNodeB in the remaining region. At this time, since the RN cannot simultaneously perform the transmission and reception in the same frequency band, it takes a certain time to switch the RN from the transmission mode to the reception mode. Accordingly, it is necessary to set a guard time (GT) to switch the RN from the transmission mode to the reception mode in a first portion of the backhaul downlink reception region. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Is or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval except for the guard time. Such PDCCH and the PDSCH are physical channels dedicated for RN and thus may be represented by an R-PDCCH (Relay-PDCCH) and an R-PDSCH (Relay-PDSCH).

Figure 11:
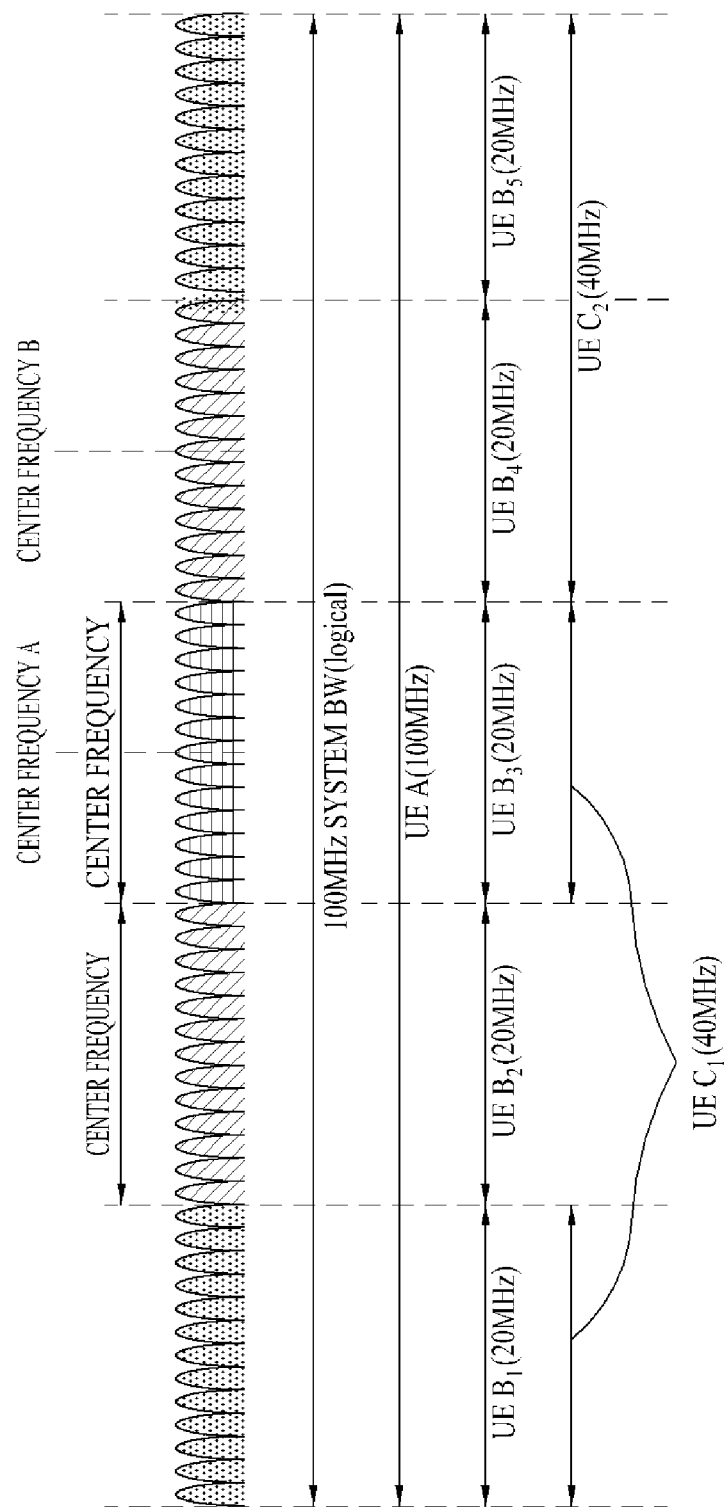
FIG. 11 is a conceptual diagram illustrating a carrier aggregation scheme.

Hereinafter, a carrier aggregation scheme will be described. FIG. 11 is a conceptual diagram illustrating a carrier aggregation scheme.

Carrier aggregation refers to a method of enabling a UE to use a plurality of frequency blocks composed of uplink resources (or component carriers) and/or downlink resources (or component carriers) or (logical) cells as a large logical frequency bandwidth in order to use a wider frequency bandwidth in a wireless communication system.

Referring to FIG. 11, an entire system bandwidth (BW) is a logical bandwidth having a maximum bandwidth of 100 MHz. The entire system bandwidth includes five component carriers (CCs) and each CC has a maximum bandwidth of 20 MHz. The CC includes one or more physically contiguous subcarriers. Although all CCs have the same bandwidth in FIG. 11, this is only exemplary and the CCs may have different bandwidths. Although the CCs are shown as being logically contiguous in the frequency domain in FIG. 11, FIG. 11 merely shows the logical concept and thus the CCs may be physically contiguous or separated.

Different center frequencies may be used for CCs or one common center frequency may be used for physically contiguous CCs. For example, in FIG. 11, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system bandwidth of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system bandwidth of the LTE system. In this case, the CC may have any one bandwidth such as 1.25, 2.5, 5, 10 or 20 MHz.

In the case in which the entire system bandwidth is extended by carrier aggregation, a frequency bandwidth used for communication with each UE is defined in CC units. A UE A may use 100 MHz which is the entire system bandwidth and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or discontiguous. The UE $C_1$ uses two discontiguous CCs and the UE $C_2$ uses two contiguous CCs.

Hereinafter, a method of measuring a channel quality indicator (CQI) will be described.

In general, a method of determining a CQI index for a downlink channel at a UE is implemented as follows.

1) First, the UE receives an RS from an eNB, selects a best precoding matrix index (PMI) for each rank based on a predefined PMI codebook using the RS, and calculates a per-layer signal to interference plus noise ratio (SINR) according to the selected PMI. In addition, a per-codeword SINR is calculated based on the per-layer SINR and a codeword-to-layer mapping rule.

2) Spectral efficiency (SE) satisfying 10% of a block error rate (BLER) at each per-codeword SINR is calculated and a per-codeword throughput is calculated using $N_{RE}$ which is the number of resource elements (REs) available in a PDCCH and the SE.

3) A per-rank throughput sum is calculated based on the per-codeword throughput and a largest throughput and a rank corresponding thereto are selected. That is, a rank indicator (RI) is decided. In a predefined CQI table, values obtained by multiplying the SE by $N_{RE}$ of the PDSCH are compared with the largest throughput and a most similar CQI index is reported to the eNB.

In the LTE system, assumptions of reference resource for CQI measurement shown in Table 1 are defined and include an assumption for $N_{RE}$ of the PDSCH necessary for the above CQI calculation process. Here, reference resource refers to a resource region to which a CQI is assumed to be applied. The UE receives one or more RSs from the eNB and measures a CQI based on the RSs. At this time, it is assumed that a PDSCH corresponding to the CQI is transmitted on the assumptions shown in Table 1.

TABLE 1

In the CQI reference resource, the UE shall assume the following for the purpose of deriving the CQI index:
 1. The first 3 OFDM symbols are occupied by control signaling
 2. No resource elements used by primary or secondary synchronization signals or PBCH
 3. CP length of the non-MBSFN subframes
 4. Redundancy Version 0
 5. The PDSCH transmission scheme depending on the transmission mode currently configured for the UE (which may be the default mode)
 6. The ratio of PDSCH EPRE to cell-specific RS EPRE is as given with
   the exception of $\rho_A$ which shall be assumed to be
   $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one:
   $\rho_A = P_A + \Delta_{offset}$ [dB] for any modulation scheme and any number of layers, otherwise.
 The shift $\Delta_{offset}$ is given by the parameter nomPDSCH-RS-EPRE-Offset which is configured by higher-layer signaling.

Assumption 1 of Table 1 indicates that a PDSCH is not transmitted on the first three OFDM symbols of one subframe when calculating a CQI. Since the PDCCH is changed on a per subframe basis, the UE which is not aware of the number of PDCCH symbols of a subframe to which the CQI is applied calculates the CQI by assuming a maximum number of symbols capable of being transmitted by the PDCCH.

The eNB which receives the CQI calculated as described above may add a separate compensation value to suit an actual configuration in downlink transmission corresponding to the CQI (e.g., the number of PDCCH symbols of the subframe to which the CQI is applied), and decide a downlink transport block size, etc., which will be described in greater detail with reference to the drawings.

Figure 12:
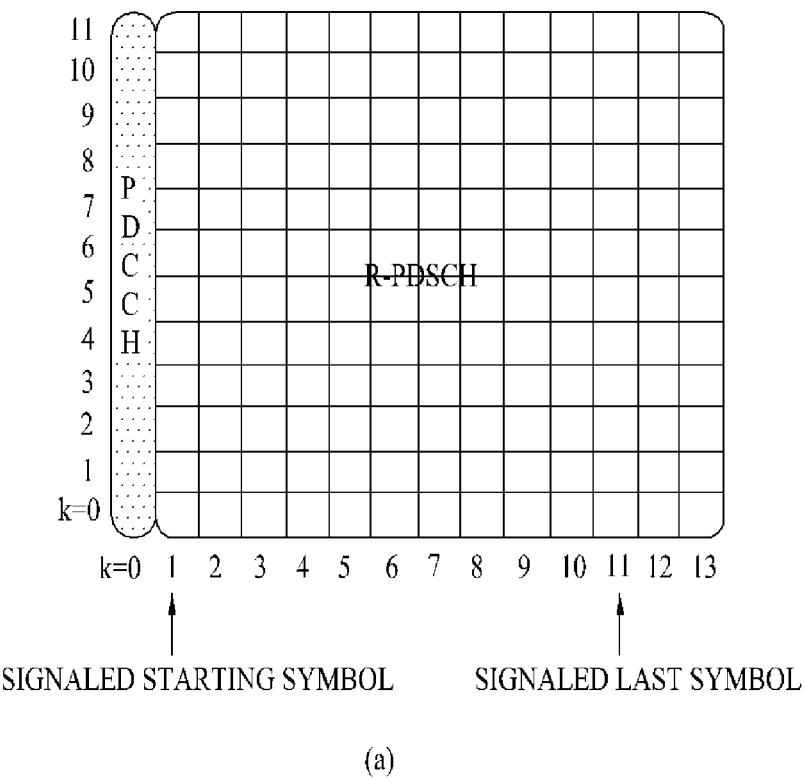
FIG. 12 is a diagram showing a possible symbol configuration in a backhaul link.
Figure 12:
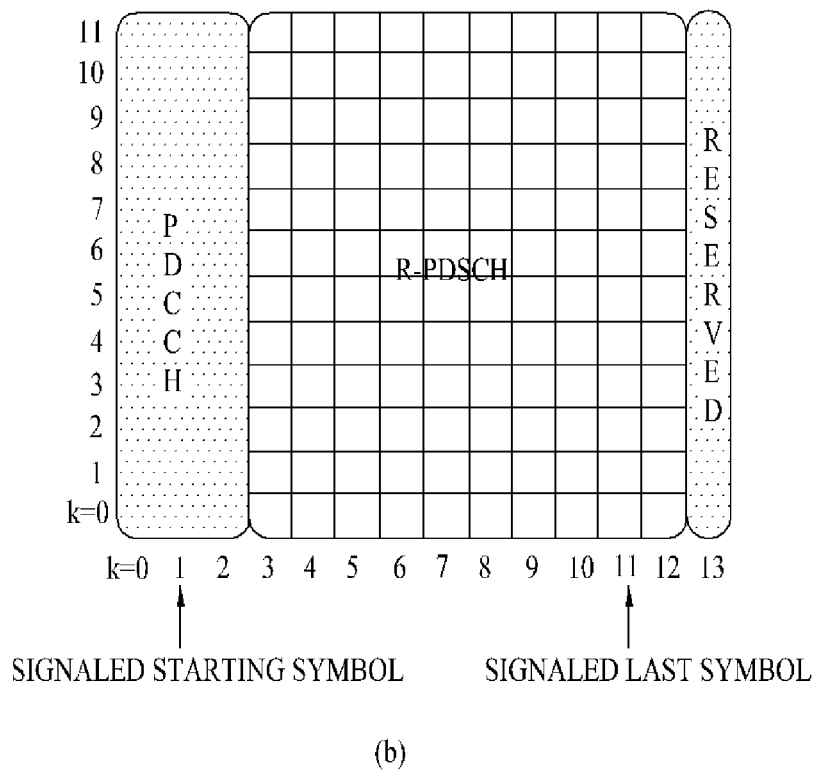

FIG. 12 is a diagram showing a possible symbol configuration in a backhaul link. In particular, in FIG. 12(a), it is assumed that one symbol is used in a PDCCH for a UE controlled by an eNB, that is, a macro UE, and symbols having symbol indexes of 1 to 13 are used in an R-PDSCH.

In addition, in FIG. 12(b), it is assumed that the first three symbols are used in a PDCCH for a macro UE and a last symbol is reserved for securing transmission/reception switching timing of an RN, and symbols having the remaining symbol indexes of 3 to 12 are used in an R-PDSCH. Accordingly, 13 OFDM symbols are used for a backhaul link in FIG. 12(a) and 10 symbols are used for a backhaul link in FIG. 12(b). Accordingly, in FIG. 12, if comparison is performed only in terms of the number of symbols, a difference between the numbers of symbols used for the R-PDSCH is only three.

Accordingly, if it is assumed that the number of symbols used for the R-PDSCH is small on the assumption for CQI calculation shown in Table 1, a cording rate is set to be higher than an appropriate level, thereby leading to resource waste. If it is assumed that the number of symbols used for the R-PDSCH is large, an error rate is increased and, if a valid coding rate is equal to or greater than a predetermined level, a receiver may not perform decoding.

The present invention proposes a method of applying a configuration upon actual transmission to CQI measurement in order to reduce error which may occur when a configuration upon actual transmission and a configuration assumed upon CQI measurement are different from each other as described above. Although the case where a backhaul link and a carrier aggregation scheme are applied in the following embodiment, the present invention is not limited thereto.

Hereinafter, in order to measure a CQI by applying a region in which an actual R-PDSCH is transmitted, a method of applying a starting symbol and a last symbol of an R-PDSCH and a method of applying the number of REs reserved for a DM-RS will be described. In addition, an embodiment of utilizing the number of REs reserved for an R-PDCCH will also be described.

An RN is described in the TS 36.216 which is the 3GPP standard document. In particular, configuration information of a backhaul link, that is, information about a starting symbol and a last symbol of an R-PDSCH in one subframe, is semi-statically signaled to an RN using a higher layer signal. Accordingly, in the present invention, an RN calculates a region, in which an R-PDSCH is transmitted, based on the starting symbol and the last symbol received through the higher layer signal, when performing CQI calculation in a backhaul downlink.

Accordingly, the region is calculated in the backhaul downlink through the starting symbol and the last symbol received through the higher layer signal and all or part of this region is applied upon CQI calculation on the assumption that all or part of this region is used to transmit the R-PDSCH. Since information about the starting symbol and the last symbol signaled to the RN is a semi-static signal, which is generally maintained for a predetermined time, the number of available REs for the R-PDSCH is calculated using the information about the actually signaled starting symbol and last symbol, thereby reducing resource waste and maintaining an appropriate BLER level.

For example, in the present invention, only the starting position of the backhaul downlink is used. That is, it may be assumed that previous symbols of the starting symbol which is received through the higher layer signal are not used for the backhaul downlink or only symbols after the starting symbol are used for the backhaul downlink.

In addition, if the RN receives the information about the last symbol from the eNB through the higher layer signal, it may be assumed that the last symbol is not included in CQI calculation in the backhaul downlink. In general, the last symbol may be a symbol having a symbol index 13, that is, a fourteenth symbol. However, in the RN, the last symbol may not be used due to transmission/reception switching timing. This situation may be considered when calculating available REs for CQI calculation. For example, in the backhaul downlink, the last symbol may have a symbol index of 12 or 13.

In addition, if backhaul downlink transmission is performed based on a specific transmission mode, the eNB may use a DM-RS for data modulation and demodulation. In the DM-RS, the number of reserved REs is changed according to a transmission rank. That is, if the rank is 1 or 2, 12 REs are used to transmit a DM-RS in one PRB pair and, if the rank is 3 to 8, 24 REs are used to transmit a DM-RS. This means that one or two symbols are reserved for DM-RS transmission.

In addition, if a last symbol is not transmitted for transmission/reception switching timing of an RN, a DM-RS allocated to a second slot may not be transmitted in one subframe. In this case, for DM-RS transmission, if the rank is 1 or 2, 6 REs are used to transmit a DM-RS in one PRB pair and, if the rank is 3 to 8, 12 REs are used to transmit a DM-RS. This means that 0.5 symbols or one symbol are reserved for DM-RS transmission.

That is, since REs corresponding to 0.5, 1 or 2 symbols in one PRB pair are reserved for a DM-RS, a CQI may be calculated on the assumption of 24 REs or 12 REs which is a maximum number of REs reserved for the DM-RS.

Since the rank is signaled by a set transmission mode or an RI, in general, the rank is not easily changed. Accordingly, it is possible to calculate the number of available REs of an R-PDSCH by applying the number of REs reserved for the DM-RS according to the actually signaled rank information.

In a backhaul downlink between an eNB and an RN, unlike an access downlink between an RN and a UE, an R-PDCCH is mapped to the existing PDSCH region. The R-PDCCH may not be transmitted in a subframe in which an R-PDSCH is transmitted or may be allocated to only one or more specific PRB pairs if the R-PDSCH is transmitted.

The RN detects the R-PDCCH through blind decoding. In a higher layer, in order to reduce blind decoding complexity of the RN, a search space for blind decoding may be specified on a per RN basis and may be individually indicated.

Accordingly, in the present invention, on the assumption that the number of REs for an R-PDCCH is set to a predetermined fixed value when calculating a CQI for an R-PDSCH, the number of available REs for the R-PDSCH is calculated. For example, on the assumption that the R-PDCCH is not transmitted in the subframe, the R-PDCCH may not be considered when calculating the number of available REs for the R-PDSCH.

On the assumption that the R-PDCCH is transmitted and the R-PDCCH is transmitted only in a specific number of PRB pairs, the number of available REs for the R-PDSCH may be calculated. That is, the amount of resources allocated to the search space defined through the higher layer may be excluded from the number of REs for the R-PDCCH, upon CQI measurement. In particular, since the R-PDSCH may not be mapped to the search space, the number of available REs may be more accurately calculated so as to measure an accurate CQI.

Figure 13:
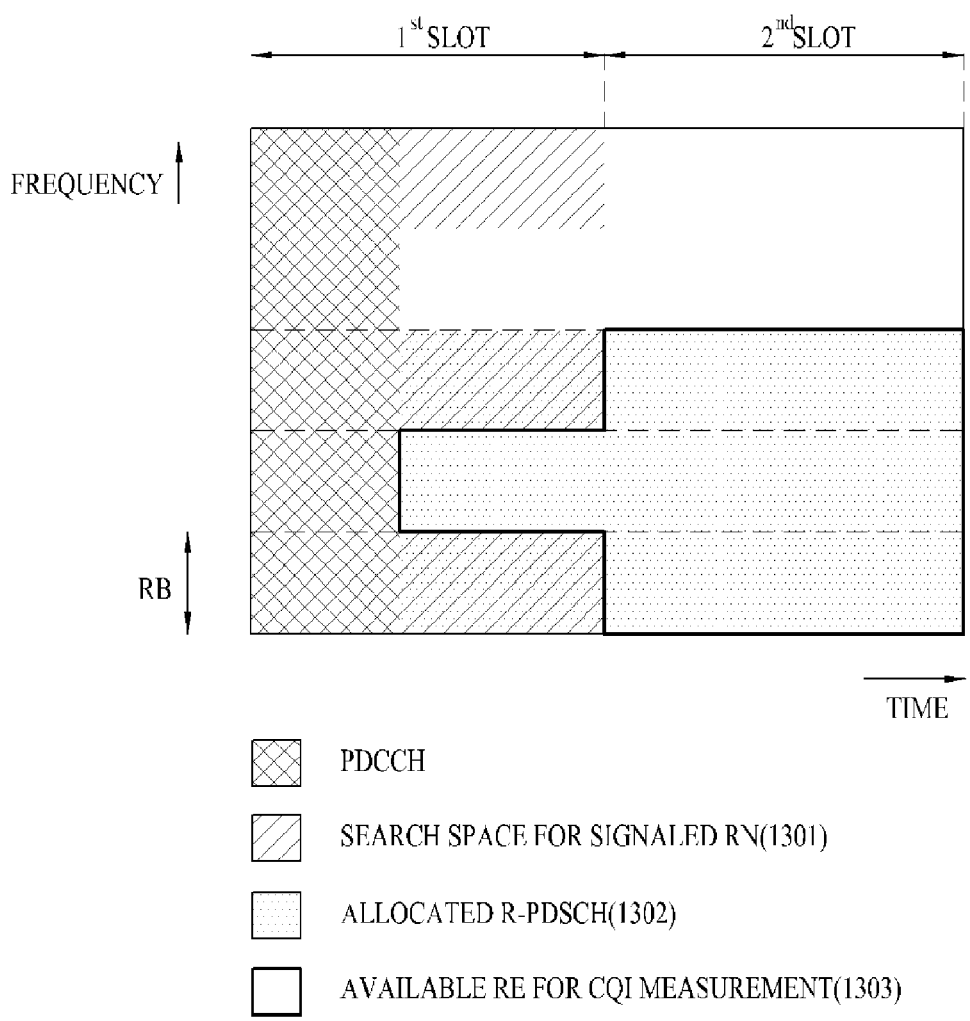
FIG. 13 is a diagram showing the concept for applying the number of resource elements for an R-PDCCH upon CQI measurement according to an embodiment of the present invention.

FIG. 13 is a diagram showing the concept for applying the number of REs for an R-PDCCH upon CQI measurement according to an embodiment of the present invention.

In particular, in FIG. 13, a reference numeral 1301 denotes a search space for an R-PDCCH defined through a higher layer and a reference numeral 1302 denotes an R-PDSCH region allocated to an RN. The R-PDCCH transmitted to the RN may be appropriately interleaved and transmitted in the region 1301 and the R-PDSCH may not be mapped thereto. Accordingly, according to the present invention, the RN considers only a region 1303 as the number of available REs upon CQI calculation.

The above-described method is limited to the case of interleaving and mapping the R-PDCCH. The above-described method is not limited to the R-PDCCH and is applicable to an Enhanced-PDCCH (E-PDCCH) if a PDCCH is inserted into the existing PDSCH region.

As described above, in order to calculate the number of REs upon CQI calculation for an R-PDSCH, starting symbol index information and last symbol index information signaled through a higher layer, the number of REs reserved for a DM-RS, the number of REs for an R-PDCCH or a combination of two or more thereof may be considered.

Figure 14:
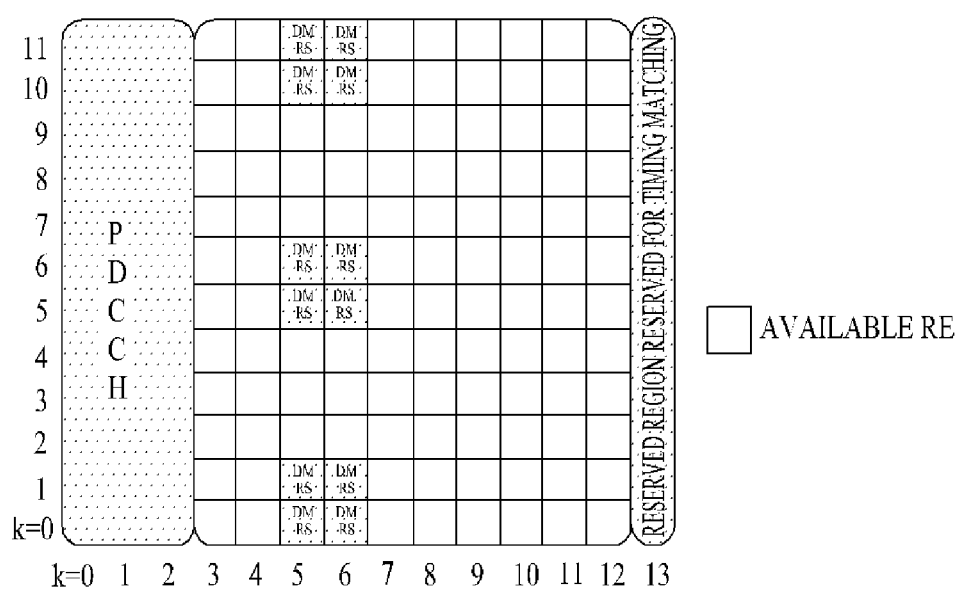
FIG. 14 is a diagram showing a method of calculating the number of resource elements upon CQI calculation for an R-PDSCH PDSCH according to an embodiment of the present invention.

FIG. 14 is a diagram showing a method of calculating the number of REs upon CQI calculation for an R-PDSCH according to an embodiment of the present invention.

Referring to FIG. 14, it is assumed that R-PDSCH transmission starts at a symbol index 3 and a last symbol is reserved for transmission/reception switching time and is not used for the R-PDSCH. In addition, it is assumed that a DM-RS having a rank of 3 or 4 is transmitted and the R-PDCCH is not transmitted. In particular, since the last symbol is reserved for transmission/reception switching timing, the DM-RS is not transmitted in a second slot.

Through such an assumption, it can be seen that the number of available REs for the R-PDSCH is 108 in one PRB pair.

Although only the DM-RS is considered as the RS transmitted to the RN, another RS, that is, a CSI-RS and a CRS may be considered. In particular, as in a backhaul link, the number of REs reserved for an RS is not constant according to a subframe configuration and a subframe index in an MBSFN subframe. However, changing the number of REs reserved for the RS whenever performing CQI measurement increases inefficiency and complexity.

First, a CSI-RS is not transmitted in every subframe, but is transmitted with a predetermined period. Since the transmission frequency of the CSI-RS is relatively low, REs reserved for the CSI-RS may not be considered upon CQI calculation, although the CSI-RS is transmitted.

Although the existing standard document describes that a CRS is considered upon CQI calculation, in newly included transmission mode 9, since an MBSFN subframe may be used as resources for CQI measurement, a new criterion is necessary upon CQI calculation.

In particular, in transmission mode 9, since DM-RS transmission is performed, CRS transmission may not be necessary. Accordingly, in transmission mode 9, an MBSFN subframe is specified as resources for CQI measurement and, preferably, a CRS is not transmitted in a data region. That is, in transmission mode 9, if at least a predetermined number of subframes is set as an MBSFN subframe, REs reserved for the CRS may not be considered upon CQI calculation.

In transmission mode 9, since all subframes may not be set as the MBSFN subframe, a significant number of non-MBSFN subframes may be included. If the predetermined number of subframes is set as the MBSFN subframe, the number of REs for the CRS is always considered in order to reduce complexity of that the number of REs for the CRS differs according to the kind of the subframe. That is, in transmission mode 9, it is assumed that a corresponding subframe is a non-MBSFN subframe upon CQI calculation.

As another embodiment of the present invention, if the above-described carrier aggregation scheme is applied, backhaul downlink transmission is performed using several component carriers. At this time, the PDCCH may be transmitted via only one component carrier. Other component carriers scheduled at this time may semi-statically confirm the number of symbols of the PDCCH transmitted therethrough through a higher layer signal. In this case, a method of calculating a CQI in consideration of the signaled number of symbols of the PDCCH may be implemented.

It will be apparent to those skilled in the art that the embodiment of the present invention is applicable not only to a backhaul downlink channel of an RN but also to CQI measurement of a UE.

Figure 15:
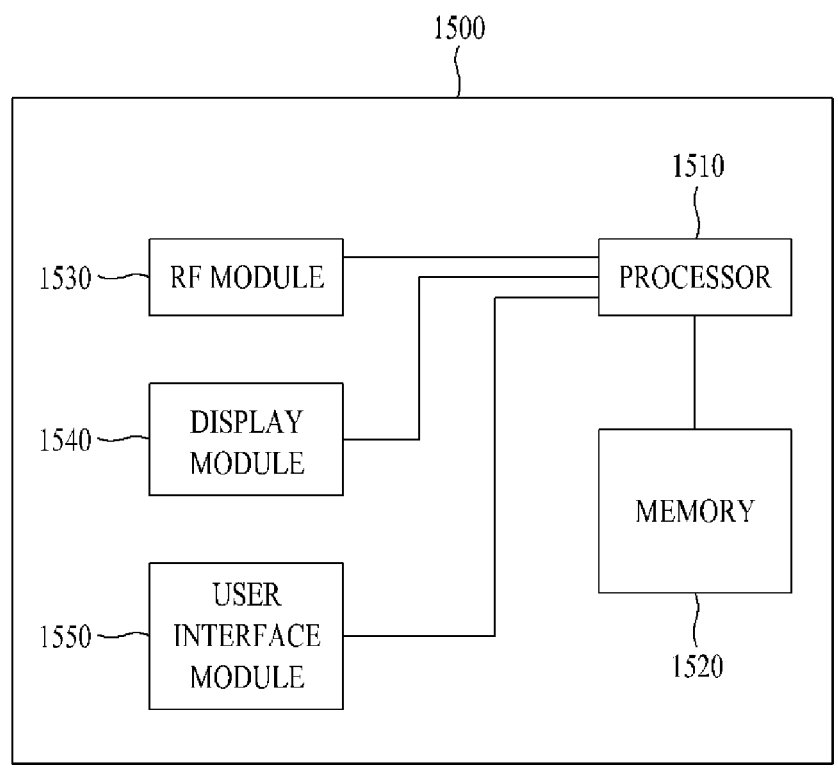
FIG. 15 is a block diagram showing a communication apparatus according to an embodiment of the present invention.

FIG. 15 is a block diagram showing a communication apparatus according to an embodiment of the present invention.

Referring to FIG. 15, a communication apparatus 1500 includes a processor 1510, a memory 1520, a Radio Frequency (RF) module 1530, a display module 1540 and a user interface module 1550.

The communication apparatus 1500 is shown for convenience of description and some modules thereof may be omitted. In addition, the communication apparatus 1500 may further include necessary modules. In addition, some modules of the communication apparatus 1500 may be subdivided. The processor 1510 is configured to perform an operation of the embodiment of the present invention described with respect to the drawings. More specifically, for the detailed operation of the processor 1510, reference may be made to the description associated with FIGS. 1 to 14.

The memory 1520 is connected to the processor 1510 so as to store an operating system, an application, program code, data and the like. The RF module 1530 is connected to the processor 1510 so as to perform a function for converting a baseband signal into a radio signal or converting a radio signal into a baseband signal. The RF module 1530 performs analog conversion, amplification, filtering and frequency up-conversion or inverse processes thereof. The display module 1540 is connected to the processor 1510 so as to display a variety of information. As the display module 1540, although not limited thereto, a well-known device such as a Liquid Crystal Display (LCD), a Light Emitting Diode (LED), or an Organic Light Emitting Diode (OLED) may be used. The user interface module 1550 is connected to the processor 1510 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and an RN. Specific operations to be conducted by the base station in the present invention may also be conducted by an upper node of the base station as necessary. In other words, it will be obvious to those skilled in the art that various operations for enabling the base station to communicate with the UE in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method and apparatus for reporting a channel quality indicator by an RN in a wireless communication system is described as being applied to a 3GPP LTE system, the present invention is applicable to various wireless communication systems other than the 3GPP LTE system.

The invention claimed is:

1. A method for reporting a channel quality indicator at a user equipment (UE) in a wireless communication system, the method performed by the UE and comprising:

receiving, from a base station, common reference signals (CRSs) via a first set of resource elements (REs) through a non-MBSFN (Multicast Broadcast Single Frequency Network) subframe, wherein the first set of REs are located on at least one symbol of a first slot of the non-MBSFN subframe and at least one symbol of a second slot of the non-MBSFN subframe;

receiving, from the base station, CRSs via a second set of REs through a MBSFN subframe, wherein the second set of REs are located only on a first slot of the MBSFN subframe;

obtaining a channel quality indicator (CQI) using a specific set of REs which are different from the second set of REs, for the MBSFN subframe for a specific transmission mode; and reporting the CQI for the MBSFN subframe, for the specific transmission mode to the base station, wherein, for the specific transmission mode, both the MBSFN subframe and the non-MBSFN subframe are valid subframes to obtain the CQI, and wherein, for the specific transmission mode, the UE obtains the CQI under an assumption that the specific set of REs are in the MBSFN subframe as the first set of REs are in the non-MBSFN subframe.

2. The method of claim 1, wherein the specific transmission mode is a mode of a physical downlink shared channel (PDSCH) that is transmitted from the base station to the UE based on a DM-RS (Demodulation Reference Signal).

3. The method of claim 1, wherein the MBSFN subframe is an invalid subframe to obtain the CQI for transmission modes other than the specific transmission mode.

4. The method of claim 1, wherein the UE obtains the CQI for the specific transmission mode under an assumption that the valid subframes have a predetermined number of available REs for obtaining the CQI.

5. The method of claim 4, wherein the second set of REs is not used as the available REs for obtaining the CQI.

6. A user equipment (UE) in a wireless communication system, the UE comprising:
a receiver;
a transmitter; and
a processor coupled to a memory and configured to:
receive, from a base station, common reference signals (CRSs) via a first set of resource elements (REs) through a non-MBSFN (Multicast Broadcast Single Frequency Network) subframe, wherein the first set of REs are located on at least one symbol of a first slot of the non-MBSFN subframe and at least one symbol of a second slot of the non-MBSFN subframe;

receive, from the base station, CRSs via a second set of REs through a MBSFN subframe, wherein the second set of REs are located only on a first slot of the MBSFN subframe;

obtain a channel quality indicator (CQI) using a specific set of REs which are different from the second set of REs, for the MBSFN subframe, for a specific transmission mode; and report the CQI for the MBSFN subframe, for the specific transmission mode to the base station, wherein, for the specific transmission mode, both the MBSFN subframe and the non-MBSFN subframe are valid subframes to obtain the CQI, and wherein, for the specific transmission mode, the UE obtains the CQI under an assumption that the specific set of REs are in the MBSFN subframe as the first set of REs are in the non-MBSFN subframe.

7. The UE of claim 6, wherein the specific transmission mode is a mode of a physical downlink shared channel (PDSCH) that is transmitted from the base station to the UE based on a DM-RS (Demodulation Reference Signal) from the base station to the UE.

8. The UE of claim 6, wherein the MBSFN subframe is an invalid subframe to obtain the CQI for transmission modes other than the specific transmission mode.

9. The UE of claim 6, wherein the processor obtains the CQI for the specific transmission mode under an assumption that the valid subframes have a predetermined number of available REs for obtaining the CQI.

10. The UE of claim 9, wherein the second set of REs is not used as the available REs for obtaining the CQI.

* * * * *